United States Patent [19]

Weitzman et al.

[11] Patent Number: 4,988,044
[45] Date of Patent: Jan. 29, 1991

[54] STEEL CAN SHREDDING/DELABELING SYSTEM AND METHOD

[75] Inventors: David H. Weitzman; Jeffrey M. Young, both of Utica, N.Y.

[73] Assignee: Resource Recycling Technologies, Inc., Binghamton, N.Y.

[21] Appl. No.: 319,361

[22] Filed: Mar. 6, 1989

[51] Int. Cl.$^5$ .................... B02C 21/00; B02C 23/22
[52] U.S. Cl. ..................................... 241/14; 241/19; 241/24; 241/61; 241/77; 241/79.1; 241/81; 241/DIG. 38
[58] Field of Search ............... 241/14, 19, 24, 60, 241/61, 73, 79.1, 76, 77, 81, DIG. 38

[56] References Cited

U.S. PATENT DOCUMENTS

| | | | |
|---|---|---|---|
| 3,925,198 | 12/1975 | Eckhoff et al. | 241/DIG. 38 X |
| 3,963,181 | 6/1976 | Deloy et al. | 241/79.1 X |
| 3,981,454 | 9/1976 | Williams | 241/DIG. 38 X |
| 4,139,454 | 2/1979 | Larson | 241/DIG. 38 |

Primary Examiner—Timothy V. Eley
Attorney, Agent, or Firm—Wall and Roehrig

[57] ABSTRACT

A steel can shredding/delabeling system processes post-consumer steel cans, taken from a solid weight stream, into a densified product suitable for detinning. The steel cans are transported and fed into a surge hopper that feeds cans into a shredder. The surge hopper is designed to maintain a continuous feed to the shredder to optimize shredding efficiency. As the steel cans pass through the shredder, they are transformed into shredded, densified steel particles with the paper labels removed and reduced to paper fines. This mixture of shredded cans and paper fines is transferred by conveyor to the top of a multi-pass aspirator. The aspirator utilizes an upward air flow within a column of the aspirator to separate the materials on the basis of their terminal velocities in air. The mixture free falls down a series of cascades, while being subjected to the upward flow of air. The heavier, delabeled can shreds exit at the bottom into a transfer conveyor where the processed material is transported for storage or further processing. The exhaust air from the aspirator, together with the entrained paper fines, continues to a cyclone chamber where the paper fines drop out into a trash receptacle.

11 Claims, 1 Drawing Sheet

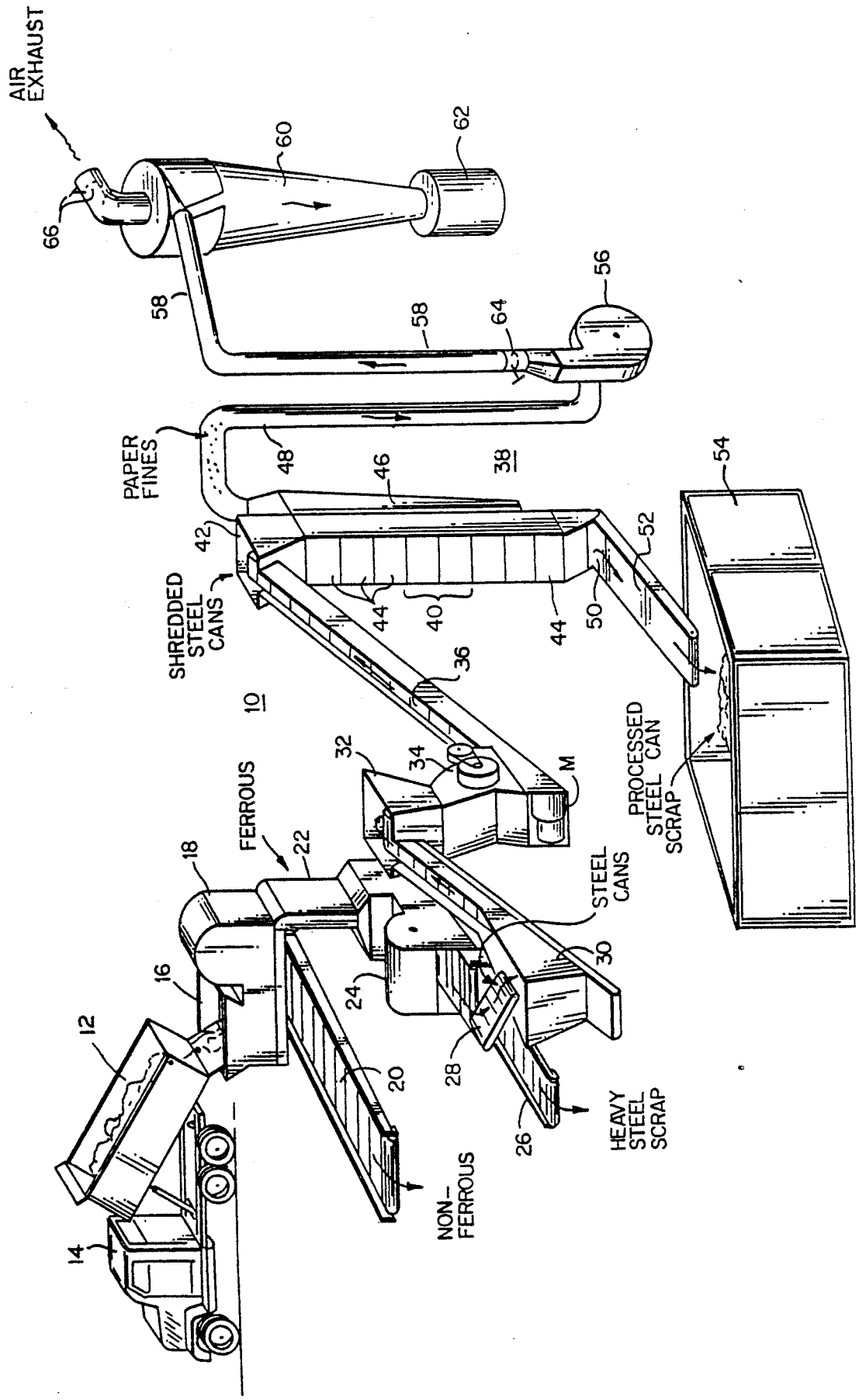

STEEL CAN SHREDDING/DELABELING SYSTEM AND METHOD

BACKGROUND OF THE INVENTION

This invention relates to equipment for the recovery of the scrap value of recycled materials, and to apparatus for classifying and separating metal scrap. The invention is more particularly directed to method and apparatus for processing steel cans from a solid waste stream to render the steel scrap suitable for detinning.

There is currently no satisfactory system for processing steel cans or tin cans from ordinary household trash into a scrap form that is suited for recovery of the tin value of the steel material. When steel cans are discarded, the consumer will seldom or never remove the paper label and will almost never rinse out the can. Consequently, a significant amount of carbonaceous material, in the form of paper and food waste accompanies cans into the waste stream. This carbonaceous material is difficult to remove, either pyrolytically or mechanically. The paper waste also interferes with the detinning operation if it remains with the cans during the detinning process. The presence of paper is especially troublesome if the cans are crushed to densify the material.

OBJECTS AND SUMMARY OF THE INVENTION

It is an object of this invention to provide a technique for processing post-consumer steel cans, i.e., food cans, to facilitate recovery of the tin value thereof It is a related object of this invention to provide such a technique which can be used with steel cans, bimetal cans (part steel, part aluminum), and mixtures thereof. It is another object of this invention to provide a can shredding/delabeling system which accepts either steel cans separated from a commingled, source-separated container stream collected as part of a recycling program, or steel cans separated from a municipal solid waste stream, in which cans are emptied, but unrinsed and with labels intact, thereby minimizing the preparation required by the consumer.

It is still another object of this invention to provide a steel can shredding/delabeling system that renders the steel cans into a scrap product that is ready for detinning while simultaneously increasing the density of the scrap material, thereby reducing overall shipping costs from the scrap processor to the detinning works.

According to an object of this invention, the steel can shredding and delabeling apparatus accepts the post-consumer steel cans in a surge hopper which feeds out the cans at a controlled, steady rate, to a shredder or comminuter which, in turn, shreds the steel cans into a mixture of metal particles and paper fines. This mixture is then fed from an outlet of the shredder into an air classification aspirator, of the type that has a column or tower with an inlet at the top to receive the can scrap mixture, and an outlet at the bottom to which the metal particles fall against an upwardly flowing air stream. The aspirator is preferably a multi-pass aspirator, with a plurality of compartments, i.e., cascades or passes, that are defined between successive, vertically arranged baffles within the column. The aspirator utilizes the interaction of the respective terminal velocities and air movement to separate and classify the two types of material. The can scrap mixture free-falls down these cascades or passes while being subjected to the upward flow of air. The heavier delabeled can shreds exit at the bottom outlet into a hopper or transfer conveyor. The stream of air, and the entrained label paper fines, with other carbonaceous matter, is pneumatically conveyed to a cyclone separator, where the paper fines are removed from the process exhaust air. The paper fines then drop into a paper trash receptacle. The shredded steel scrap material from the bottom outlet of the aspirator column is in dense, particulate form, substantially free of paper waste, and so it can be fed directly to a detinning process.

In several preferred embodiments, a magnetic separation stage in advance of the surge hopper can be employed for separating the steel cans from non-ferrous solid waste materials, e.g., paperboard boxes, plastic bags, etc. An additional magnetic separation stage can be employed to separate heavy steel parts, such as large bolts, electric motor housings, disposable propane tanks, and the like, from the steel cans, as these heavy items can damage the shredder. This additional magnetic separating stage can employ a magnet of a predetermined strength sufficient to pick up the steel cans, which are relatively light, but not strong enough to pick up the heavy steel parts, which then pass into an additional conveyor or bin.

The above and many other objects, features, and advantages of this invention will be more fully appreciated from the ensuing description of a preferred embodiment, which should be read in connection with the accompanying Drawing.

BRIEF DESCRIPTION OF THE DRAWING

The sole drawing FIGURE is a schematic view of a steel can shredding and delabeling apparatus according to one preferred embodiment of this invention.

DETAILED DESCRIPTION OF A PREFERRED EMBODIMENT

With reference to the sole drawing FIGURE, a steel can shredding and delabeling system 10 is here shown to receive solid waste 12 delivered from a truck 14 into a hopper 16. In this embodiment, the solid waste material 12 proceeds to a magnetic or other classification device 18 for a presort operation. There the ferrous materials, including the tin cans in the waste stream, are separated from the remaining, non-ferrous waste, which proceeds out on a scrap conveyor 20. The ferrous scrap materials then proceed through a scrap outlet chute 22 to a secondary magnetic separator 24. Here, a magnet of limited strength lifts the steel cans, which are rather light, and separates them out from heavy steel articles in the waste stream. The latter proceed away on a conveyor 26. The separated steel cans proceed along a conveyor 28 from the separator 24 to a surge hopper 30. The surge hopper supplies the steel can material at a steady, controlled rate into a hopper 32 of a rotary shredder or comminuter 34. The shredder can be of conventional design, such as the Model 320 device, manufactured by Proveda, Inc., of Jackson Center, Ohio. The shredder 34 receives the cans from the top, which are then contacted by rotary flails or hammer bars, and driven through an outlet screen as a mixture of shredded steel scrap and paper fines. Due to the nature of this type of shredder, and contrary to most other shredders, the shreds are not tightly folded over or balled. The result of this is that very little, if any, paper is trapped in folds in the can shreds. Also, a maximum of can surface remains exposed for receiving detinning solution in a subsequent detinning operation. The shredder detaches the paper and other carbonaceous material from the metal particles, but these continue as a physical mixture of metal particles and fines of paper and other materials.

A conveyor 36 carries the shredded mixture from beneath the shredder 34 to an aspirator 38, which can be of the type commonly used in agriculture, for example, to separate kernels of grain from the accompanying chaff. In this case, the aspirator can be model no. 6G24, manufactured by Kice Industries of Wichita, Kansas.

The aspirator 38 has a tower or column 40 with an inlet hopper 42 at the top to receive the mixture from the conveyor 36. The column 40 consists of a stack of successive compartments 44, each of which has a baffle within it to interrupt the free-fall of the particles descending within the column 40. These several successive compartment baffles serve as cascades over which the material passes to aid in separation of the lightweight paper fines from the denser metal particles in the can scrap mixture. On a reverse wall of the column 40 is an air closet 46 which extends vertically the length of the column 40 and opens into each of the compartments 44. At the top of this air closet 46 is connected an exhaust air conduit 48. At the bottom of the column 40 is an outlet 50 to which the shredded steel scrap drops out to a conveyor 52, which carries the steel scrap to a container 54.

A blower 56 in line in the exhaust air conduit 48 creates a suction in the conduit 40 and in the air closet 46, thereby generating the required upward flow of air within the column 40. The blower 56 exhausts into an exhaust arm 58 of the conduit which carries the exhaust air and the entrained paper fines to a cyclone chamber 60. This chamber 60 separates out the paper fines from the exhaust air stream, and these fines drop out to a paper trash receptacle 62.

A damper 64 is disposed at the exhaust side of the fan or blower 56 to control the speed of the upward air flow in the column 40, and another damper 66 on the exhaust side of the cyclone chamber 60 controls the pressure within the chamber 60 and can be adjusted to obtain optimal dropping out of the paper fines into the trash receptacle 62. The aspirator 38 separates the components of the shredded mixture from the shredder 34 on the basis of differential terminal velocities of the shredded steel scrap and the paper fines. The paper fines become entrained in the upward air flow within the column 40, and then proceed to the cyclone chamber 60 where the fines drop out to the receptacle 62. However, the rather dense steel can shreds continue to free fall through the upward flow in the column 40, and drop out through the outlet 50 to the conveyor 52.

This apparatus has been found to be highly effective in both reducing the metal of the steel cans to particulate form, and in substantially completely removing the label waste from them.

The labels, of course, need not be purely of paper, but can include plastic, cellophane, or other materials, and still be adequately processed by this system. The conveyors e.g., 20, 26, 28, 36 and 52 can be belt-conveyors, vibratory conveyors, or other known types. The shredder or comminuter 34 need not be the specific type shown, provided that it is capable of reducing the sheet steel of the cans into small pieces that are not tightly folded or balled, and also provided that the paper labels be removed from the metal.

The particular presorting phase, i.e., in those portions of the system in advance of the feed conveyor 30, need not be the specific type as shown here, but can include other segregation techniques, including manual picking.

While this invention has been shown in detail with respect to one preferred embodiment, it should be understood that the invention is not limited to that precise embodiment. Rather, many modifications and variations would present themselves to those of skill in the art without departing from the scope and spirit of this invention, as defined in the appended claims.

What is claimed is:

1. Steel can shredding and delabeling apparatus for post-consumer processing of steel cans into a scrap form suitable for detinning, comprising:

magnetic separation means for receiving incoming waste including steel cans and separating non-ferrous solid waste from said steel cans;

surge hopper means after said magnetic separation means having a hopper input to receive said steel cans and an outlet from which said cans are fed at a controlled, steady volume rate;

comminuting means having an outlet into which said cans are fed from the surge hopper means and an outlet, for shredding said steel cans into small particles of sheet steel that are not tightly folded or balled, to provide a can scrap mixture of metal particles and paper fines;

an air-classification aspirator which includes a column having an inlet at its top which receives the can scrap mixture from the outlet of the comminuting means and an outlet at its bottom, means creating an upwardly flowing air stream for separating the papers fines from the metal particles within said column, and exhaust air conduit means for conducting exhaust air and said paper fines entrained therewith from said aspirator column; and receptacle means to receive the separated steel particles from the bottom outlet of said aspirator column.

2. The apparatus of claim 1 wherein said aspirator column has a plurality of successive baffles in a vertical array to define cascades over which the can scrap mixture descends.

3. The apparatus of claim 2 wherein said column has a vertical air closet opening into each of said cascades, and having an air outlet at its upper end connected to said exhaust air conduit means.

4. The apparatus of claim 3 wherein said means creating an air stream includes an air blower in line in said exhaust air conduit means.

5. The apparatus of claim 4 wherein said exhaust air conduit means includes at least one damper for controlling the rate of flow of the air stream in said aspirator column.

6. The apparatus of claim 3 wherein said exhaust air conduit means includes a cyclone chamber for separating the paper fines from the air stream in said exhaust air conduit means.

7. The apparatus of claim 1, wherein said magnetic separation means further includes means separating heavy steel parts from said steel cans on the basis of their respective weights.

8. The apparatus of claim 7 wherein said means for separating heavy steel parts includes a magnet of a predetermined strength sufficient to pick up the steel cans, but not strong enough to pick up the heavy steel parts.

9. The apparatus of claim 1 wherein said shredder is of the type in which the cans are driven through an outlet screen by rotary hammers, so that the resulting shredded metal particles are not balled.

10. A method of post-consumer processing steel cans to reduce same to a scrap form suitable for detinning, comprising:

receiving a stream of waste materials including steel cans;

magnetically separating non-ferrous waste in said stream of waste materials from said steel cans;

supplying said cans into a surge hopper;

feeding said cans from said surge hopper to a comminuter at a controlled steady volume rate;

comminuting the cans fed from the surge hopper into small particles of sheet steel that are not tightly folded or balled to produce a shredded mixture of metal particles and paper fines;

feeding the shredded mixture into an aspirator; and supplying an upward air flow into the aspirator to separate the metal particles from the paper fines on the basis of differing terminal velocities of the metal particles and the paper fines.

11. The method of claim 10, further comprising separating dense ferrous articles from the steel cans in advance of said surge hopper.

* * * * *